United States Patent

(12) United States Patent
Petrovic et al.

(10) Patent No.: US 6,885,970 B2
(45) Date of Patent: Apr. 26, 2005

(54) SALIENCY-BASED POSITION ESTIMATION IN PERMANENT MAGNET SYNCHRONOUS MOTORS

(75) Inventors: Vladan Petrovic, West Roxbury, MA (US); Alex M. Stankovic, Boston, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 10/394,504

(22) Filed: Mar. 20, 2003

(65) Prior Publication Data

US 2003/0233200 A1 Dec. 18, 2003

Related U.S. Application Data

(60) Provisional application No. 60/366,047, filed on Mar. 20, 2002.

(51) Int. Cl.[7] .................................................. G01B 7/28
(52) U.S. Cl. ...................... 702/169; 318/747; 318/797; 318/805; 318/825
(58) Field of Search .......................... 702/169; 318/747, 318/797, 805, 825

(56) References Cited

U.S. PATENT DOCUMENTS

| | | | | |
|---|---|---|---|---|
| 6,060,860 A | * | 5/2000 | Itoh et al. ..................... 318/809 |
| 6,135,943 A | * | 10/2000 | Yu et al. ........................ 600/16 |
| 6,301,137 B1 | * | 10/2001 | Li ................................ 363/98 |
| 6,326,750 B1 | * | 12/2001 | Marcinkiewicz ............. 318/432 |
| 6,433,506 B1 | * | 8/2002 | Pavlov et al. ................ 318/804 |
| 6,549,871 B1 | * | 4/2003 | Mir et al. ..................... 702/145 |
| 6,583,995 B1 | * | 6/2003 | Kalman et al. ............... 363/35 |
| 6,653,829 B1 | * | 11/2003 | Henry et al. ........... 324/207.21 |
| 6,661,194 B1 | * | 12/2003 | Zaremba et al. ............. 318/727 |

* cited by examiner

*Primary Examiner*—Marc S. Hoff
*Assistant Examiner*—Anthony Gutierrez
(74) *Attorney, Agent, or Firm*—Weingarten, Schurgin, Gagnebin & Lebovici LLP

(57) ABSTRACT

A method and system for the sensorless estimation of the states of the mechanical subsystem of a motor are disclosed. In particular, the method and system split the estimation problem into two sub-problems: the estimation of motor parameters as a function of position, and the determination of the states of the mechanical subsystem of the motor using the estimated parameters via a state observer. Motor current and PWM voltage in a polyphase system is measured or otherwise determined and converted into current and voltage in $\alpha$-$\beta$ coordinates. A least square estimator is constructed that uses the voltage and current in $\alpha$-$\beta$ coordinates and provides an estimate of the motor parameters, and in particular, the inductances of the motor, which are a function of the rotor position. These estimated inductances are used to drive a state observer whose dynamics have been selected to provide as an output the state of the mechanical subsystem of the motor, and in particular, the position, velocity, and acceleration of this subsystem.

4 Claims, 4 Drawing Sheets

US 6,885,970 B2

SALIENCY-BASED POSITION ESTIMATION IN PERMANENT MAGNET SYNCHRONOUS MOTORS

CROSS REFERENCE TO RELATED APPLICATIONS

This application claims the priority of U.S. Provisional Patent Application No. 60/366,047 filed, Mar. 20, 2002 entitled SALIENCY-BASED POSITION ESTIMATION IN PM SYNCHRONOUS MOTORS, the whole of which is hereby incorporated by reference herein.

STATEMENT REGARDING FEDERALLY SPONSORED RESEARCH OR DEVELOPMENT

Part of the work leading to this invention was carried out with United States Government support provided under a grant from the Office of Naval Research, Grant No. N00014-97-1-0704 and under a grant from the National Science Foundation, Grant No. EC9502636 Therefore, the. U.S. Government has certain rights in this invention.

BACKGROUND OF THE INVENTION

This invention relates generally to motor position estimation systems and in particular to motor position estimation systems for permanent magnet synchronous motors.

Permanent magnet synchronous motors (PMSMs) have become increasingly popular in high-performance variable-frequency drives due to their high efficiency, high torque-to-inertia ratio, rapid dynamic response, and relatively simple modeling and control. To achieve the proper field position orientation in motion control applications, it is necessary to obtain the actual position of the rotor magnets. Typically, this position is obtained through the use of position sensors mounted on the motor shaft. These position sensors can include a shaft encoder, resolver, Hall effect sensor, or other form of angle sensor. These sensors typically are expensive, require careful installation and alignment, and are fragile. Accordingly, the the use of these position sensors both in terms actual cost to produce the product and in the costs associated with the maintenance and repair of these systems is high.

Sensorless position estimation systems have been developed to overcome these limitations, but the present sensorless position estimation systems have their own drawbacks as well. These systems typically fall into two categories: back emf methods and signal injection methods. Back emf systems use the measured back emf voltage to estimate the position of the rotor magnets. The back emf voltage signal is roughly proportional to the rotational velocity of the motor. Although this method achieves valid results at higher rotational velocities, at low rotational velocities and high torque settings, the back emf voltage signal decreases to values that are too small to be useful, and vanish entirely at speeds close to a standstill. Thus, the back emf method is not suitable for these low rotational velocity high torque applications. The second method is the signal injection method in which an auxiliary signal is introduced into the motor electrical subsystem and measure the response of the motor electrical subsystem to estimate the rotor position. Although this method avoids the singularities of the back emf method, these methods are computationally intensive and thus are not well suited for industrial applications.

Accordingly, it would be advantageous to provide a position estimation system that avoids the singularities at low speeds and the computationally intensive methods of the prior art.

BRIEF SUMMARY OF THE INVENTION

A method and system for the sensorless estimation of the states of the mechanical subsystem of a motor are disclosed. In particular, the method and system split the estimation problem into two sub-problems: the estimation of motor parameters as a function of position, and the determination of the states of the mechanical subsystem of the motor using the estimated parameters via a state observer. Motor current and PWM voltage in a polyphase system is measured or otherwise determined and converted into current and voltage in $\alpha$-$\beta$ coordinates. A least square estimator is constructed that uses the voltage and current in $\alpha$-$\beta$ coordinates and provides an estimate of the motor parameters, and in particular, the inductances of the motor, which are a function of the rotor position. These estimated inductances are used to drive a state observer whose dynamics have been selected to provide as an output the state of the mechanical subsystem of the motor, and in particular, the position, velocity, and acceleration of this subsystem.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

Figure 1:
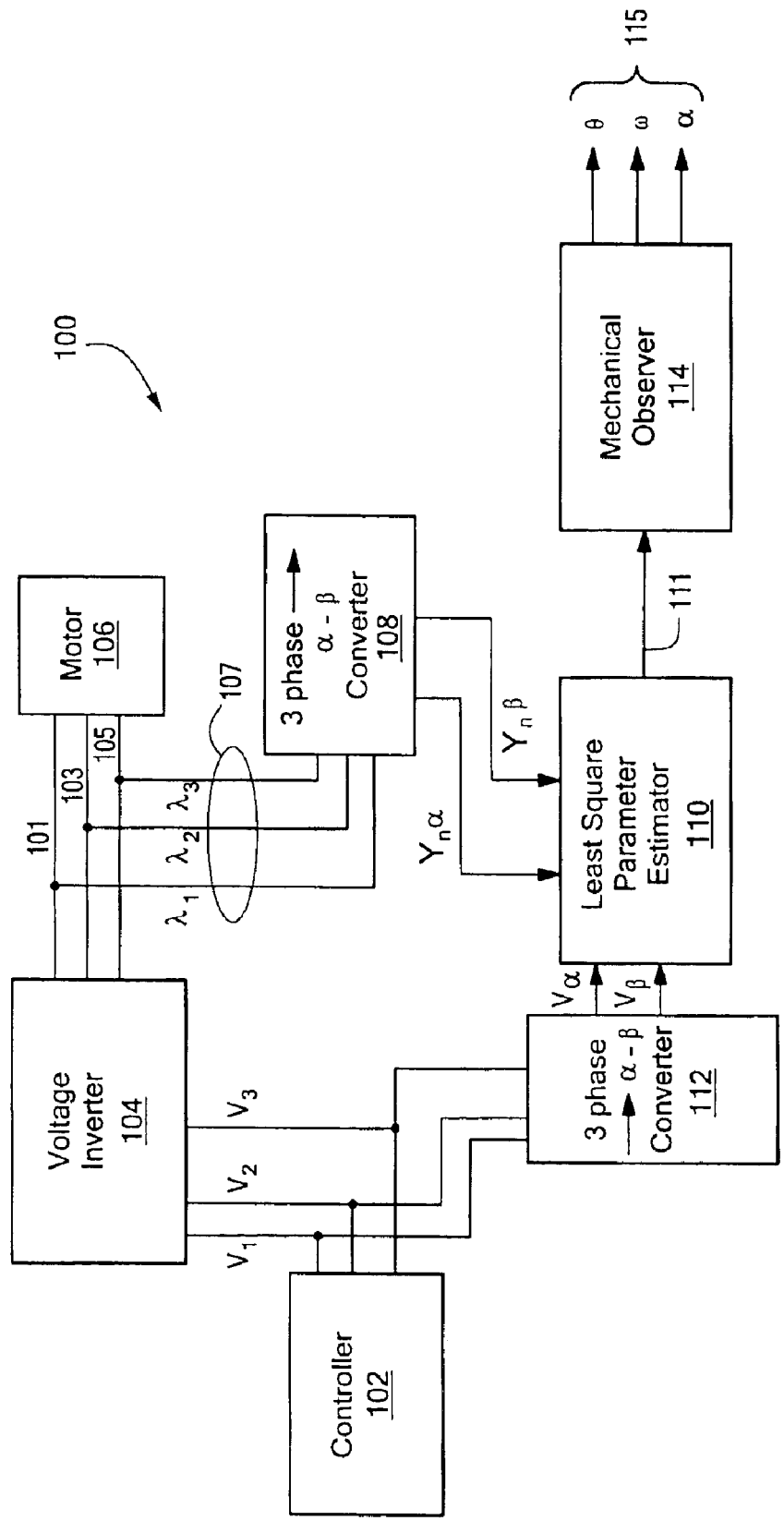
FIG. 1 is a block diagram of an embodiment of the sensorless position estimation system.

FIG. 1 depicts a block diagram of one embodiment of the sensorless position estimation system ("system"). The system 100 includes a controller 102 providing 3 phase PWM control signals to a voltage inverter 104 that is responsive to the PWM control signals by providing the appropriate phasing to the three currents 101, 103, 105 to the motor 106. The three currents 101, 103, and 105 are sensed by current sensor 107 and provided to a 3-phase to $\alpha$-$\beta$ converter module 108. The converter module 108 transforms the 3-phase currents into 2 phases and provides $i_\alpha$ and $i_\beta$ values using the well standard transformation:

$$\begin{bmatrix} y_\alpha \\ y_\beta \end{bmatrix} = \sqrt{\frac{2}{3}} \begin{bmatrix} 1 & \frac{1}{2} & -\frac{1}{2} \\ 0 & \sqrt{\frac{3}{2}} & -\sqrt{\frac{3}{2}} \end{bmatrix} \begin{bmatrix} x_1 \\ x_2 \\ x_3 \end{bmatrix}$$

where $y_\alpha$ and $y_\beta$ are the output in $\alpha$-$\beta$ coordinates and $x_1$, $x_2$, and $x_3$ are the 3 polyphase current values. The $\alpha$-$\beta$ currents, $y_\alpha$ and $y_\beta$, are then provided to the least square parameter estimator 110.

The controller 102 also provides the 3-phase PWM control signals to another 3-phase to $\alpha$-$\beta$ converter module 112 that converts the 3-phase voltage commands into $\alpha$-$\beta$ coordinates using the above transformation in which $x_1$, $x_2$, and $x_3$ are the 3 polyphase voltage signals and $y_\alpha$ and $y_\beta$ are the voltages $v_\alpha$ and $v_\beta$ and are provided to the parameter estimator 110. The parameter estimator 110 uses the transformed current and voltage signals to estimate a set of parameters for the motor 106. These estimated parameters are provided as an input to the mechanical observer 114 that uses the estimated parameters to provide estimates of the position, velocity, and acceleration of the mechanical subsystem of motor 106.

The magnetic field of a motor with salient rotors changes along the circumference. In addition to this non-isotropic behavior due to rotor geometry, in permanent magnetic synchronous motor (PMSMs) additional asymmetry is introduced by the non-uniform magnetic saturation of the stator steel. Due to these phenomena, the fluxes through the stator windings produced by the phase currents are a function of the rotor position that implies a position dependence of the stator phase inductances. The resulting stator inductance matrix in a stationary α-β frame is given by:

$$L = \begin{bmatrix} L_0 + L_1\cos(2\theta) & L_1\sin(2\theta) \\ L_1\sin(2\theta) & L_0 - L_1\cos(2\theta) \end{bmatrix} \quad (1)$$

The equations describing the electrical subsystem of the motor in the α-β frame are:

$$v = R_s i + \frac{d\lambda}{dt} \quad (2)$$

$$\lambda = Li + \lambda_r$$

where $v=[v_\alpha v_\beta]^T$ and $i=[i_\alpha i_\beta]^T$ are the vectors of the stator phase voltages and currents, $\lambda=[\lambda_\alpha \lambda_\beta]^T$ and $\lambda_T=[\lambda_{r\alpha}\lambda_{r\beta}]^T$ are the vector of stator phase total and partial fluxes, which are due to the rotor field and $R_s$=diag[Rs, Rs] is the matrix of the stator phase resistances. Combining the above equations yields the following electrical subsystem in the α-β frame:

$$v = \left(R_s + \omega \frac{dL}{d\theta}\right)i + L\frac{di}{dt} + \omega \frac{d\lambda_r}{d\theta} \quad (3)$$

where $$R_s = \begin{bmatrix} R_s - 2\omega L_1\sin(2\theta) & 2\omega L_1\cos(2\theta) \\ 2\omega L_1\cos(2\theta) & R_s + 2\omega L_1\sin(2\theta) \end{bmatrix} \quad (4)$$

is the effective resistance matrix.

The torque produced by the motor includes reluctance and mutual components and, neglecting torque ripple, is given by:

$$\tau_m = P\left(\frac{1}{2}i^T \frac{dL}{d\theta}i + i^T \frac{d\lambda_r}{d\theta}\right) \quad (5)$$

where P is the number of pole pairs. The mechanical behavior of the motor is modeled with the viscous friction and inertia as:

$$J\frac{d\omega}{dt} = \tau_m - B\omega - \tau_l \quad (6)$$

$$\frac{d\theta}{dt} = \omega$$

where J and B are the moment of inertia and the friction constant normalized with respect to P, and $\tau_l$ is the load torque.

The position estimation system utilizes the above model and uses the mechanical state variables as parameters in the inductance and resistance matrices. This method uses the electrical transients, which have a much faster time constant than the mechanical transients, to estimate the approximately constant parameters of the system. The electrical subsystem is given by:

$$v = Ri + L\frac{di}{dt} + \omega \frac{d\lambda_r}{d\theta} \quad (7)$$

where $$L = \begin{bmatrix} L_0 + L_1\cos(2\theta) & L_1\sin(2\theta) \\ L_1\sin(2\theta) & L_0 - L_1\cos(2\theta) \end{bmatrix},$$

$$R = \begin{bmatrix} R_s - 2\omega L_1\sin(2\theta) & 2\omega L_1\cos(2\theta) \\ 2\omega L_1\cos(2\theta) & R_s + 2\omega L_1\sin(2\theta) \end{bmatrix}$$

are the inductance and effective resistance matrices, where $$L_0 = \frac{L_d + L_q}{s}, \; L_1 = \frac{L_d - L_q}{2}.$$

Figure 2:
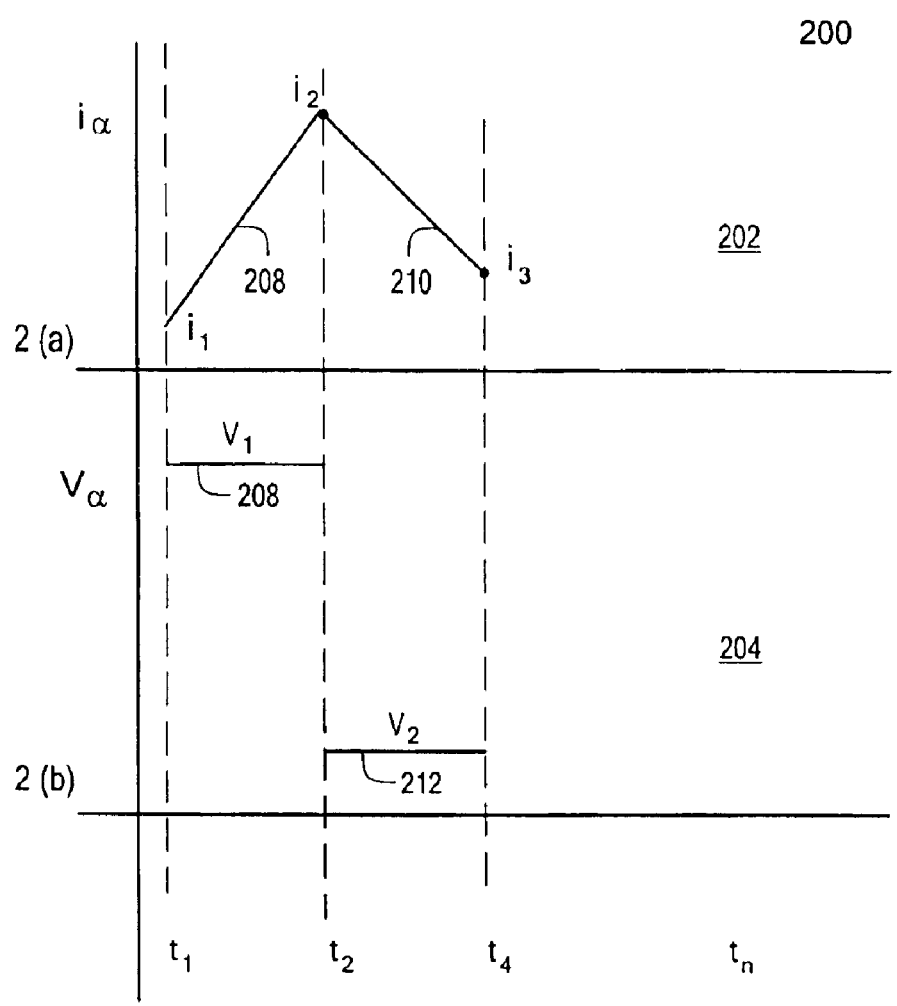
FIG. 2 is a set of graphs depicting voltage and current waveforms in conjunction with the embodiment of the sensorless position estimator depicted in FIG. 1.

FIG. 2 depicts representative current and voltage waveforms in a single PWM period consisting of 1, 2, 3, ... N subintervals. It is assumed that the voltage $v_\alpha$ in graph 2(*b*) is constant over the entire subinterval and that the current in graph 2(*a*) is substantially linear over the entire subinterval. Thus, the integration of equation (7) over the ($t_{n+1}$, $t_n$) interval and division by this interval to discretize equation (7) yields:

$$v_n = R\frac{i_{n+1} + i_n}{2} + L\frac{i_{n+1} + i_n}{t_{n+1} - t_n} + \omega \frac{d\lambda_r}{d\theta} \quad (8)$$

where n=1, 2, ... N, and N is a number of subintervals within one PWM period. Assuming that the mechanical parameters do not change from one subinterval to another, the back emf term, i.e., the ω term in equation (8) can be removed by subtracting two subsequent subintervals which yields:

$$v_{n+2} - v_{n+1} = L\left(\frac{i_{n+2} + i_{n+1}}{t_{n+2} - t_{n+1}} - \frac{i_{n+1} + i_n}{t_{n+1} - t_n}\right) + R\left(\frac{i_{n+2} + i_{n+1}}{2}\right) \quad (9)$$

At the PWM frequencies that are contemplated for use in this system, the contribution of the R term in equation (9) is negligible, and accordingly the term is neglected. This reduces the problem to be solved to:

$$w_n = Lx_n \text{ where} \quad (10)$$

$$w_n = v_{n+1} - v_n \quad (11)$$

$$x_n = \left(\frac{i_{n+2} + i_{n+1}}{t_{n+2} - t_{n+1}} - \frac{i_{n+1} + i_n}{t_{n+1} - t_n}\right)$$

where $x_n$ is the slope of the current is determined.

To solve the parameter estimation problem, a least squares problem is constructed, but to simplify the process of solving the least squares problem, equation (10) is rewritten such that unknown matrix containing the parameters to be estimated multiplied by the already known voltage values as:

$$x_n = L^{-1} w_n \quad \text{where} \tag{12}$$

$$L^{-1} = \frac{1}{L_0^2 - L_1^2} \begin{bmatrix} L_0 - L_1\cos(2\theta) & -L_1\sin(2\theta) \\ -L_1\sin(2\theta) & L_0 + L_1\cos(2\theta) \end{bmatrix} \tag{13}$$

A parameterization to be used in the estimation problem is given by:

$$q = \begin{bmatrix} q_0 \\ q_1 \\ q_2 \end{bmatrix} = \frac{1}{L_0^2 - L_1^2} \begin{bmatrix} L_0 \\ -L_1\cos(2\theta) \\ -Ll\sin(2\theta) \end{bmatrix} \tag{14}$$

Accordingly, equation (11) can be rewritten as:

$$x_n = \begin{bmatrix} w_{n\alpha} & w_{n\alpha} & w_{n\beta} \\ w_{n\beta} & -w_{n\beta} & w_{n\alpha} \end{bmatrix} \begin{bmatrix} q_0 \\ q_1 \\ q_2 \end{bmatrix} \tag{15}$$

for n=1,2,3, ... N−1.

Thus, equation (14) can be written $$x = Wq \tag{16}$$

where W is the matrix of the n−1 voltage differences between adjacent PWM subintervals for the α-β coordinates from equation (11).

Stacking the N−1 equations to form the least squares problem ensures that the system in equation (15) is overdetermined, the solution for the estimate of q is given by:

$$\hat{q} = (W^T W)^{-1} W_T x = W_{pi} x \tag{17}$$

Figure 3:
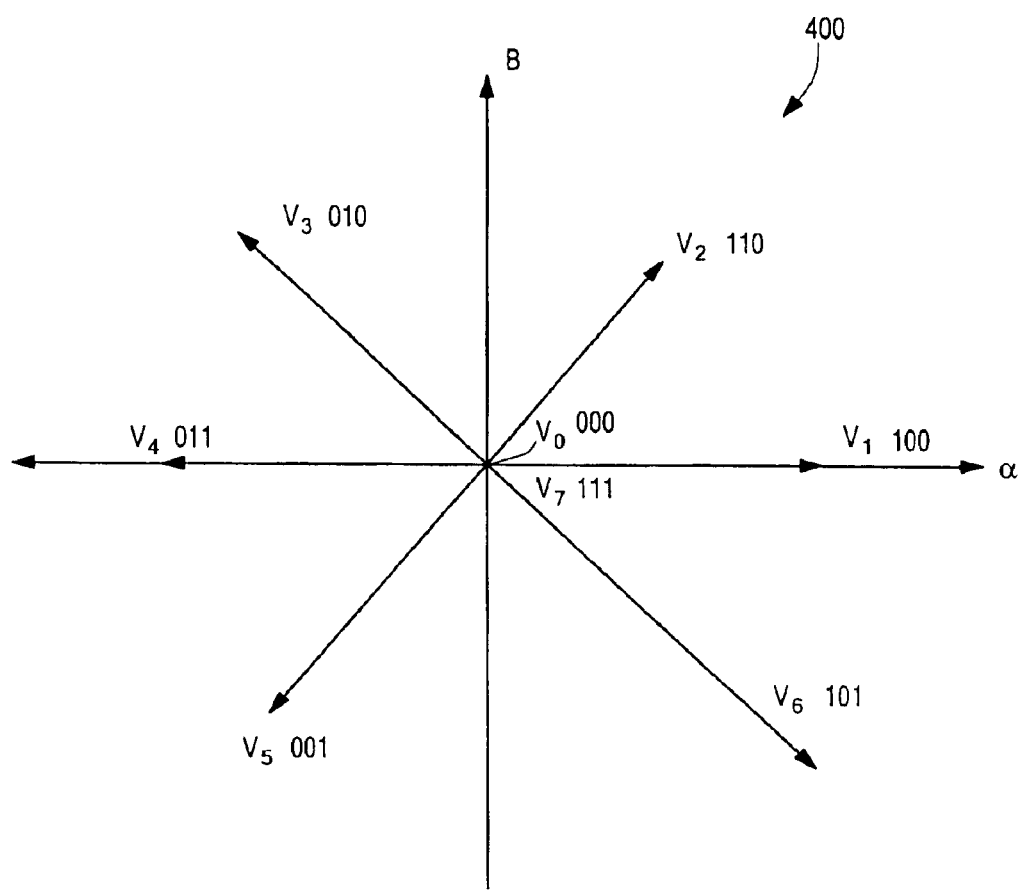
FIG. 3 is a PWM pattern constellation suitable for use with the sensorless position estimation system depicted in FIG. 1.

In order to further simplify this problem, a particular PWM pattern is used. As is known, the PWM signal is a three-bit binary signal provided by the controller 102 to the voltage inverter 104 and where a "1" indicates that the corresponding phase is connected to the voltage rail and a "0" indicates that the corresponding phase is connected to ground. As discussed above, the basic unit of time is referred to as a PWM period that is subdivided into N subintervals during which a particular input switch combination is held constant. The duration of each subinterval, referred to as the "duty cycle" can vary, as can the switch combination of each subinterval. In general, the vectors and duty cycles are selected to produce the desired PWM output vector. In the embodiment described herein the PWM pattern has six subintervals and the switching combination is always each of the six non-zero PWM vectors ($V_1 \ldots V_6$), see FIG. 3 for a graphical depiction of the PWM vectors. The output PWM vector is therefore dependent upon the duty cycle of each subinterval which are computed according to:

$$\varsigma_1 = \frac{1}{6} + \frac{5\sqrt{3}}{12} \frac{v_\alpha}{v_{\max}} - \frac{7}{12} \frac{v_\beta}{v_{\max}} \tag{18}$$

$$\varsigma_2 = \frac{1}{6} - \frac{\sqrt{3}}{12} \frac{v_\alpha}{v_{\max}} + \frac{11}{12} \frac{v_\beta}{v_{\max}}$$

$$\varsigma_{3,4,5,6} = \frac{1}{6} - \frac{\sqrt{3}}{12} \frac{v_\alpha}{v_{\max}} - \frac{1}{12} \frac{v_\beta}{v_{\max}}$$

where the duty ratios are defined as $$\varsigma_i = \frac{t_i}{T_{PWM}}, \varsigma_1$$

is the duty ratio of the subinterval corresponding to the lag vector, i.e., one of the vectors adjacent to the desired vector, $\varsigma_2$ is the duty ratio of the subinterval corresponding to the lead vector, i.e., the other one of the vectors adjacent to the desired vector, and $\varsigma_{3,4,5,6}$ correspond to the other vectors.

This choice of PWM pattern that is consistent in the order in which the PWM vectors are processed and in which the value of each is consistent allows W in equation (17) to be constant over time since the voltage levels in each subinterval are the same. Thus, $W_{pi}$ can be computed off-line and $\hat{q}$, the estimate of the parameters, will be reduced to a multiplication of a constant matrix by a vector that depends on the measured current values and the duration of the subintervals.

Once $\hat{q}$ has been estimated, in one embodiment the rotor position could be computed using inverse trigonometric functions and solving equation (13) for θ. However, this has at least two disadvantages. First, the inverse trigonometric functions can be computationally intensive to calculate, and second, the parameter estimate is noisy and would not be filtered. Accordingly, to avoid these problems, in the preferred embodiment, a state estimator is provided that will provide an estimate for all the mechanical states of the system. The state estimator provides for filtering of the parameters and is not computationally intensive. The dynamics of the state observer are designed to be much faster than the dynamics of the mechanical loop controller, so that it is neglected during control loop design.

The observer has the following dynamic form:

$$\dot{\hat{\alpha}} = \gamma_3 \epsilon$$

$$\dot{\hat{\omega}} = \gamma_2 \epsilon + \hat{\alpha}$$

$$\dot{\hat{\theta}} = \gamma_1 \epsilon + \hat{\omega} \tag{19}$$

where $\hat{\theta}, \hat{\omega},$ and $\hat{\alpha}$ are the estimates of the position, speed, and acceleration respectively, $\gamma_I$ are design parameters and $\epsilon$ is a non-linear observation error that drives the variable estimates to their true value. The non-linear observation error is derived from the inductance parameters as:

$$\epsilon = \hat{p}_3 \cos(2\hat{\theta}) - \hat{p}_2 \sin(2\hat{\theta}) = L_1 \sin(2\tilde{\theta}) \tag{20}$$

where $\tilde{\theta} = \theta - \hat{\theta}$. It can be shown that the error dynamics of the state observer are non-linear with stable equilibria at $\tilde{\theta} = n\pi$ and if linearized around 0 the error dynamics are stable and the values provided by the state observer will be driven toward the correct values. The speed of the response of the state observer is determined by the placement of the poles of the system which are set by the values selected for $\gamma_i$.

The selection of the poles presents a tradeoff between the response time of the state observer and noise filtering since the bandwidth increases for a faster response time but with less filtering and vice-versa. Another consideration of the pole placement is to keep the original state observer system in equation (19) in the neighborhood of θ=0 under all operating conditions.

Accordingly, for each update of the estimated parameters, the estimated parameters are provided to the state observer in equation (19). Equation (19) is then solved and provides an estimate vector of the position, speed, and acceleration of the mechanical subsystem of the motor for the previous PWM subinterval.

Figure 4:
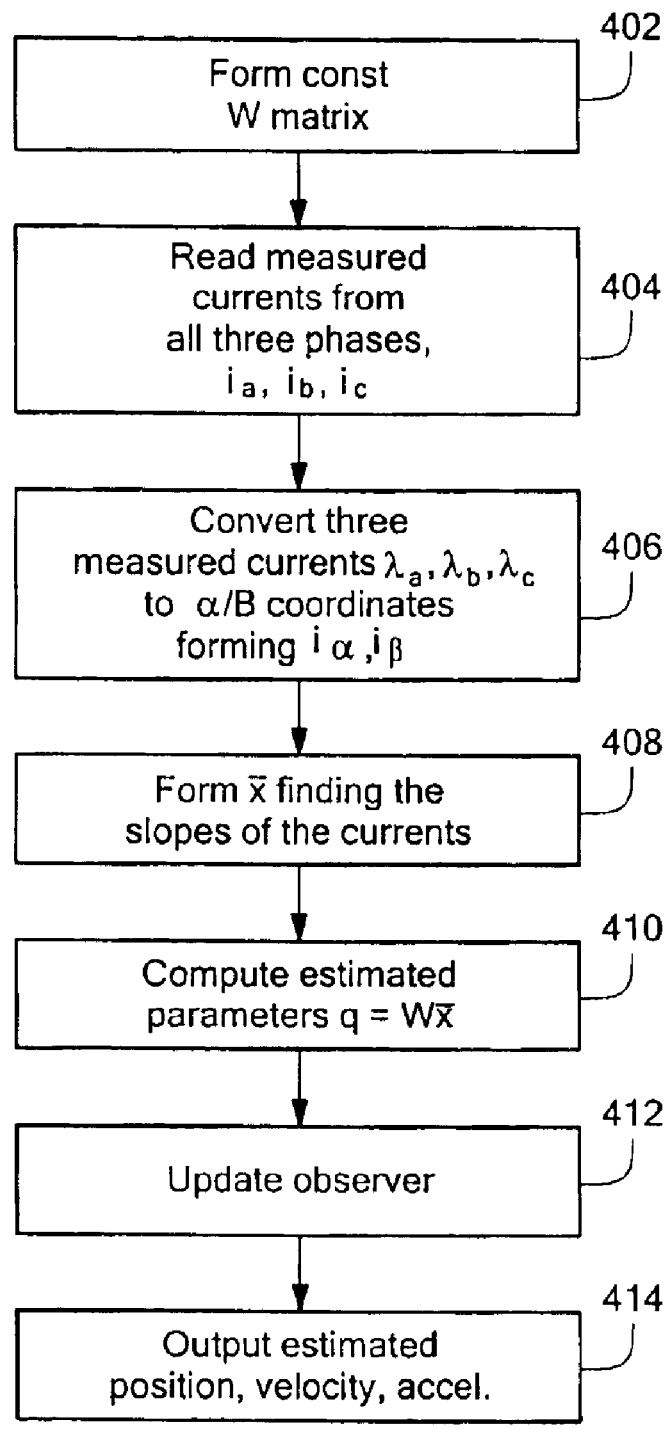
FIG. 4 is a method for performing an embodiment of the sensorless position estimation.

FIG. 4 depicts a method for performing an embodiment of the sensorless position estimation system. In step 402, the W matrix is formed based on the PWM pattern as discussed above. In step 404, the current in each phase is measured. In step 406, the three phases of current are converted into the α-β frame as discussed above. In step 408, the vector x is formed and the slope of the current is determined as discussed above. In step 410, the estimated parameters are determined according to equation (16). In step 412, the newly estimated parameters are provided to the state observer, equation (18), and the state observer is updated. In step 414 the estimated mechanical parameters, i.e., the position, velocity, and acceleration of the mechanical subsystem are output.

It should be appreciated that other variations to and modifications of the above-described sensorless position estimation system may be made without departing from the inventive concepts described herein. Accordingly, the invention should not be viewed as limited except by the scope and spirit of the appended claims.

What is claimed is:

1. An apparatus for providing a position estimate of a polyphase motor receiving polyphase current from a voltage inverter, the voltage inverter receiving PWM commands from a controller, the apparatus comprising:

a current measuring apparatus for measuring at least two polyphase currents;

an α-β converter coupled to the current measuring apparatus, the α-β converter operative to convert the polyphase currents into the α-β frame of reference, the α-β converter providing an output of the current in α-β coordinates;

the α-β converter further coupled to the controller and receiving the PWM commands therefrom, the α-β converter operative to convert the PWM commands into α-β coordinates and to provide as an output the PWM commands in α-β coordinates;

a least square estimator, receiving the current in α-β coordinates and the PWM commands in α-β coordinates, the least square estimator operative to provide an output vector q̂ of estimated parameters, the estimated parameters including estimated inductances of the motor; and a state observer coupled to the least square estimator and receiving the estimated parameters including the estimated inductances of the motor therefrom, the state observer operative to provide an output of an estimate of a mechanical subsystem of the motor that includes a position estimate of the mechanical subsystem of the motor.

2. The apparatus of claim 1 wherein the least square estimator estimates the output vector q̂ of estimated parameters by solving an equation $$q=(W^TW)_{-1}W^Tx,$$

wherein W is a matrix of n−1 voltage differences between adjacent PWM subintervals of a PWM period, and x is a vector of the polyphase currents.

3. The apparatus of claim 1 wherein the state observer is of the form:

$$\dot{\hat{\alpha}}=\gamma_3\epsilon,$$
$$\dot{\hat{\omega}}=\gamma_2\epsilon+\hat{\alpha}, \text{ and}$$
$$\dot{\hat{\theta}}=\gamma_1\epsilon+\hat{\omega},$$

wherein $\hat{\theta}$ is the position estimate, $\hat{\omega}$ is a speed estimate, and $\hat{\alpha}$ is an acceleration estimate of the mechanical subsystem of the motor, $\gamma_I$ are design parameters for setting poles of the subsystem to determine a speed of response of the state observer, and $\epsilon$ is a non-linear observation error of the form $$\epsilon=L_1 \sin(2\theta),$$

wherein θ is a position of the mechanical subsystem of the motor, and $$L_1 = \frac{L_d - L_q}{2}$$

wherein $L_1$ represents the estimated inductances of the motor, $L_d$ denoting inductance in a magnetic flux direction of the polyphase currents, and $L_q$ denoting inductance in a direction perpendicular to the magnetic flux direction.

4. A method for providing a position estimate of a polyphase motor receiving polyphase current from a voltage inverter, the voltage inverter receiving PWM commands from a controller, the method comprising the steps of:

forming a matrix W, wherein the matrix W is a matrix of n−1 voltage differences between adjacent PWM subintervals of a PWM period;

obtaining measurements of at least two polyphase currents;

converting the obtained current measurements into an α-β coordinate system;

forming a vector x, wherein the vector x is a vector of the polyphase currents;

computing an output vector q̂ of estimated parameters using an equation $\hat{q}=(W^TW)^{-1}W^Tx$;

providing the computed output vector q̂ of estimated parameters to a state observer;

updating the state observer by solving $$\dot{\hat{\alpha}}=\gamma_3\epsilon,$$
$$\dot{\hat{\omega}}=\gamma_2\epsilon+\hat{\alpha}, \text{ and}$$
$$\dot{\hat{\theta}}=\gamma_1\epsilon+\hat{\omega},$$

wherein $\hat{\theta}$ is the position estimate, $\hat{\omega}$ is a speed estimate, and $\hat{\alpha}$ is an acceleration estimate of a mechanical subsystem of the motor, $\gamma_I$ are design parameters for setting poles of the subsystem to determine a speed of response of the state observer, and $\epsilon$ is a non-linear observation error of the form $$\epsilon=L_1\sin(2\theta),$$

wherein θ is a position of the mechanical subsystem of the motor, and $$L_1 = \frac{L_d - L_q}{2},$$

and wherein $L_d$ denotes inductance in a magnetic flux direction of the polyphase currents, and $L_q$ denotes inductance in a direction perpendicular to the magnetic flux direction; and providing an output of an estimate of the mechanical subsystem of the motor that includes a position estimate of the mechanical subsystem of the motor.

* * * * *

UNITED STATES PATENT AND TRADEMARK OFFICE
CERTIFICATE OF CORRECTION

PATENT NO.      : 6,885,970 B2
APPLICATION NO. : 10/394504
DATED           : April 26, 2005
INVENTOR(S)     : Vladan Petrovic et al.

It is certified that error appears in the above-identified patent and that said Letters Patent is hereby corrected as shown below:

Column 5 (Eq. 17), line 36, "$\hat{q} = (W^T W)^{-1} W_T x = W_{pi} x$" should read --$\hat{q} = (W^T W)^{-1} W^T x = W_{pi} x$--;

Column 6, (Eq. 20), line 45, "$= \hat{p}_3 \cos(2\theta) - \hat{p}_2 \sin(2\theta) = L_1 \sin(2\theta)$" should read --$\varepsilon = \hat{p}_3 \cos(2\tilde{\theta}) - \hat{p}_2 \sin(2\tilde{\theta}) = L_1 \sin(2\theta)$--;

Column 6, line 47, "$\theta = \theta - \hat{\theta}$" should read --$\tilde{\theta} = \theta - \hat{\theta}$--;

Column 6, line 48, "$\theta = n\pi$" should read --$\tilde{\theta} = n\pi$--;

Column 6, line 59, "$\theta = 0$" should read --$\tilde{\theta} = 0$--; and

Column 7, line 67, "$\gamma^I$" should read --$\gamma_I$--.

Signed and Sealed this

Tenth Day of October, 2006

JON W. DUDAS
*Director of the United States Patent and Trademark Office*